United States Patent [19]

Mielo

[11] Patent Number: 5,582,271
[45] Date of Patent: Dec. 10, 1996

[54] METHOD AND APPARATUS FOR REMOVING MOISTURE, AIR, AND DIRT FROM LUBRICATING OIL

[75] Inventor: Ari Mielo, Oulu, Finland

[73] Assignee: Safematic Oy, Muurame, Finland

[21] Appl. No.: 481,331

[22] PCT Filed: Jan. 3, 1994

[86] PCT No.: PCT/FI94/00002

§ 371 Date: Jul. 3, 1995

§ 102(e) Date: Jul. 3, 1995

[87] PCT Pub. No.: WO94/16263

PCT Pub. Date: Jul. 21, 1994

[30] Foreign Application Priority Data

Jan. 4, 1993 [FI] Finland ................................ 930008

[51] Int. Cl.⁶ .............................................. F01M 1/10
[52] U.S. Cl. ................. 184/6.23; 184/6.24; 210/168; 210/539; 210/519; 95/262; 96/206; 96/220
[58] Field of Search ...................... 184/6.23, 6.24, 184/55.1, 57, 105.1; 210/168, 171, 172, 519, 539; 95/262; 96/204, 206, 220

[56] References Cited

U.S. PATENT DOCUMENTS

| | | | |
|---|---|---|---|
| 1,702,612 | 2/1929 | Morse | 210/519 |
| 3,638,760 | 2/1972 | Lamm | 184/6.23 |
| 5,051,116 | 9/1991 | Mattsson | 96/206 |

FOREIGN PATENT DOCUMENTS 1942301  3/1971  Germany.

OTHER PUBLICATIONS

Derwent's Abstract, No. 92-389082/47, week 9247, Abstract of SU, 1698561 Dec. 15, 1991.
Derwent's Abstract, No. 91-199854/27, week 9127, Abstract of SU, 1605081, Nov. 7, 1990.
Derwent's Abstract, No. 85-202279/33, week 8533, Abstract of SU, 1135964, Jan. 23, 1985.
Patent Abstracts of Japan, vol. 4, No. 179, M-46, abstract of JP,A,55-128611 Oct. 4, 1980.

*Primary Examiner*—Edward K. Look
*Assistant Examiner*—Christopher Verdier
*Attorney, Agent, or Firm*—Cushman Darby & Cushman, L.L.P.

[57] ABSTRACT

A method and an arrangement in a circulation lubrication including a lubricating oil tank, pressure pipe lines for supplying oil to parts to be lubricated, and return pipe lines for returning the oil from the parts to be lubricated to the oil tank. To remove air and dirt from the oil, the flow returning from the parts to be lubricated to the lubricant tank is divided into at least two superimposed flow portions, using a plate member, so that the oil flow portion containing air bubbles forms the upper flow portion and the flow portion containing water and heavy particles forms the lower flow portion.

8 Claims, 4 Drawing Sheets

METHOD AND APPARATUS FOR REMOVING MOISTURE, AIR, AND DIRT FROM LUBRICATING OIL

BACKGROUND ON THE INVENTION

The invention relates to a method which is suitable for implementation in a circulation lubrication system comprising a lubricating oil tank; pressure pipe lines for supplying oil to parts to be lubricated; return pipe lines for returning the oil from the parts to be lubricated to the oil tank; means for pumping oil into the pressure pipe lines; and adjusting means for maintaining a desired lubrication situation, wherein the flow returning from the parts to be lubricated to the lubricant tank is divided into at least two superimposed flow portions so that the oil flow portion containing air bubbles forms the upper flow portion and the flow portion containing water and heavy particles forms the lower flow portion. The invention further relates to structure provided in a circulation lubrication system.

Circulation lubrication systems are today used widely to lubricate various machines especially when the lubricant is used for cooling the part needing lubrication. An example of the use of circulation lubrication is the lubrication of the bearings of the drying cylinders in paper machines or the lubrication of gas turbines. In both cases the bearings are subject to a thermal load from the outside.

Circulation lubrication is also used when the part to be lubricated creates considerable dissipation power. One example of such applications is the lubrication of gear boxes.

Still another use of circulation lubrication is in cases where the lubricant may get dirty in the part to be lubricated, and it should be possible to reuse the lubricant after cleaning.

A circulation lubrication system usually comprises a pump operated by an electric motor. The pump brings the oil into motion. The output of the pump is usually selected so that it exceeds the required flow rate by 10 to 20%, so that a sufficient operating margin is left for the control of bypass pressure. Oil is arranged to pass through replaceable filters. The filters are often arranged in two groups so that one group can be separated by means of valves and the filters changed without having to stop the entire assembly. An electric or steam-operated heater is often used for further heating the oil. The oil is cooled by a heat exchanger having water or air cooling means. The cooling power is adjusted by a temperate regulator provided for supply oil. The set value of the temperature regulator is often typically about 55° C. Pressure control is often effected by a bypass valve back to the oil tank. Depending on the system, the set values of the pressure controller typically vary between 5 and 20 bar.

Oil is supplied to parts needing lubrication, such as different parts in a paper machine, by means of pressure trunk pipes usually made of a rustproof material. The oil flows in the pipes as a laminar flow, so the pressure drop is small. From the trunk pipes the oil is distributed to a plurality of flow metering boards wherefrom it is divided into rising pipes to be supplied to a number of parts to be lubricated. From these parts the oil is passed through return pipes by utilizing gravitation into collector pipes on the return side. The oil is passed under the influence of gravitation through the collector pipes into the tank of the circulation lubrication assembly. The pipes on the return side are never full of oil. The inclination of the pipes is about 2 to 3% towards the tank of the assembly. Before the tank, the return oil is passed through a coarse-mesh filter. Oil returned into the tank is then again sucked into circulation by the pump. The dimensions of the tank are usually such that the oil stays in the tank for 10 to 50 minutes, depending on the viscosity of the oil.

In the system the tank has several functions for conditioning the oil before recirculation. One function of the tank is to allow air (better described as gas) bubbles contained in the oil to rise to the surface. Air bubbles may increase the liability of the pump to cavitation, and they may deteriorate the lubricant film formed on the part needing lubrication. Another function is to allow large dirt particles having a density considerably higher than that of oil to deposit on the bottom of the tank. To some extent water better described as aqueous condensate drops contained in the oil will also fall down in the tank. The density of water is so close to that of oil that the falling speed is low. The tank condenses moist air flowing in the return pipes on the tank walls and drains the water along the walls, thus collecting the water on the bottom of the tank. The tank also cools the oil through the walls. Furthermore, the tank forms a space into which the pipe lines are emptied at system shutdowns, and the tank serves as an oil storage vessel in the case of a pipe leakage, so that the machine to be lubricated can be shut down controllably. Still another function of the tank is to ensure that there is always oil in the pump suction means in order that air will not be sucked along. The moisture and suitable temperature also enable bacteria to grow in the tank.

The tank has also associated thermostat-controlled oil heaters, which may be electric heaters or steam-operated heaters. The heaters are used to heat the great amount of oil contained in the oil tank within 4 to 8 hours typically to about 55° C., before the system is started as the screw pumps used are not able to pump cold oil of high viscosity at full power without the risk of cavitation.

In principle, the systems described above operate well; in practice, however, they have several drawbacks as a result of which the operation of the systems is not the best possible. One drawback is the entrainment of moisture, air and heavy dirt particles through the return pipes to the tank, as air in the form of air bubbles is carried along with the oil, and water is formed as a result of condensation, for example. Dirt particles are mixed with the oil e.g. at the parts to be lubricated. These drawbacks are especially apparent in paper machines as there plenty of both dirt and moisture below the hood in the drying section. Moreover, it is to be noted that the temperature is high below the hood due to the steam heating of the drying cylinders. The moisture content of air is high due to the moisture evaporated from the paper web. For this reason, a large amount of water is condensed in the oil, which causes problems in the tank, as the moisture, air bubbles and dirt have to be removed from the oil before the oil is again fed from the tank to the parts to be lubricated.

SUMMARY OF THE INVENTION

The object of the invention is to provide a method and an arrangement, by means of which the drawbacks of the prior art can be eliminated. This is achieved by means of a method according to the invention, which is characterized in that the upper flow portion is passed close to the surface of the oil contained in the tank, and that the lower flow portion is passed close to the bottom of the tank. The arrangement according to the invention, in turn, is characterized in that the plate member is arranged to pass the upper flow portion close to the surface of the oil contained in the tank and the lower flow portion together with a substantially parallel control plate close to the bottom of the tank.

An advantage of the invention is mainly that the moisture, air and dirt can be removed very efficiently from the oil returning from the parts to be lubricated. Another advantage of the invention is that it is simple, so that its reliability in operation is high and it is economical to take into use. The invention also allows the operation of the circulation lubrication system to be improved as the quality of oil can be kept higher than previously. This is due to the fact that the invention enables the oil to be cleaned very efficiently.

BRIEF DESCRIPTION OF THE DRAWINGS

In the following the invention will be described in greater detail with reference to the preferred embodiments shown in the attached drawings, wherein.

DETAILED DESCRIPTION

Figure 1:
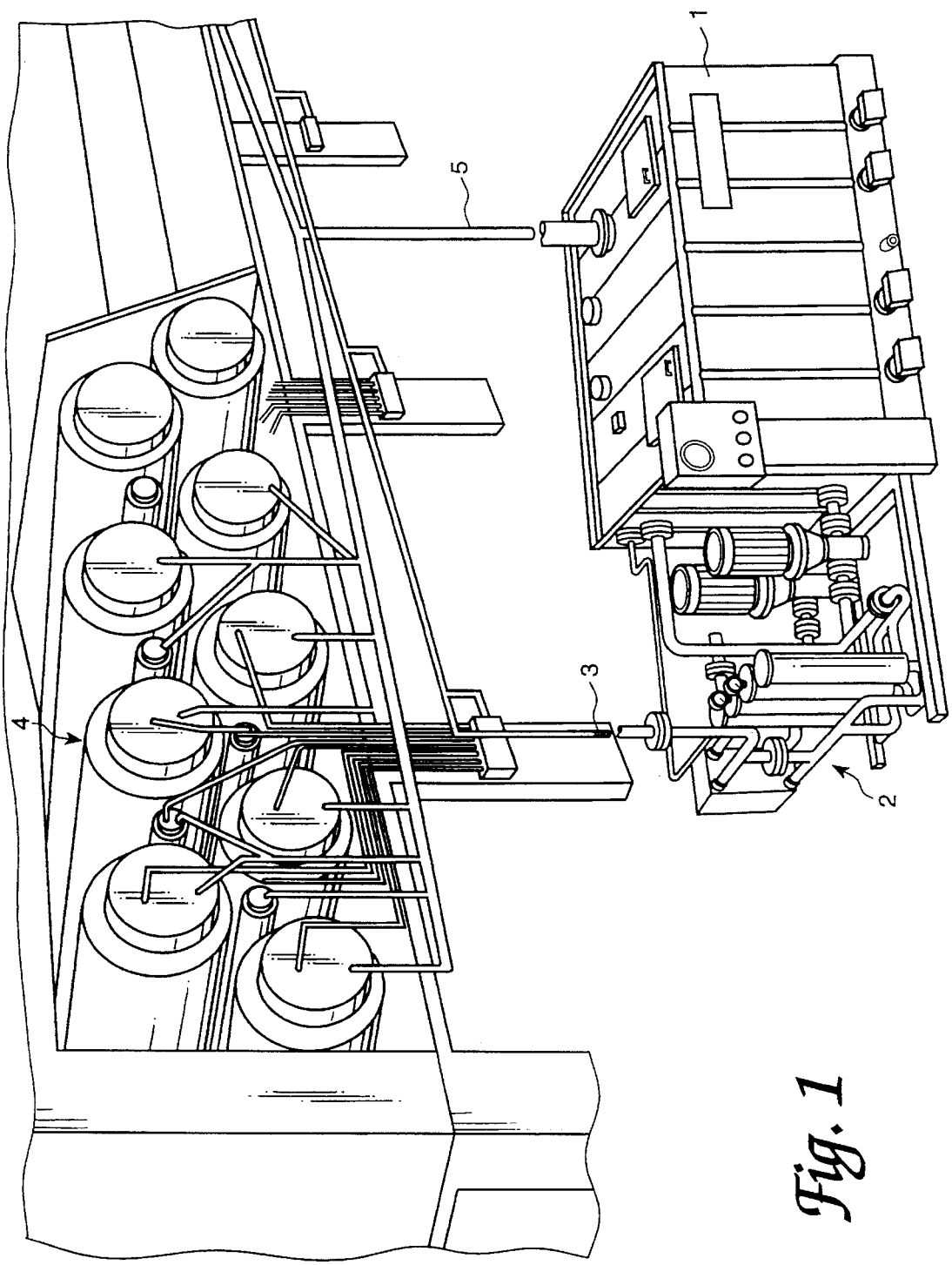
FIG. 1 is a general view of a circulation lubrication system for a paper machine.

FIG. 1 is a general view of a circulation lubrication system for a paper machine. The reference numeral 1 indicates an oil tank, and the reference numeral 2 indicates generally an assembly comprising pumps, filters and other similar devices. The reference numeral 3 shows pressure pipe lines for supplying oil used as a lubricant to parts 4 to be lubricated, in this special case drying cylinders in the paper machine. Further in FIG. 1, the reference numeral 5 indicates return pipe lines for returning the oil from the parts to be lubricated to the oil tank 1. The structure and operation of the system shown in FIG. 1 are obvious to one skilled in the art, so these matters will not be described more closely herein.

Figure 2:
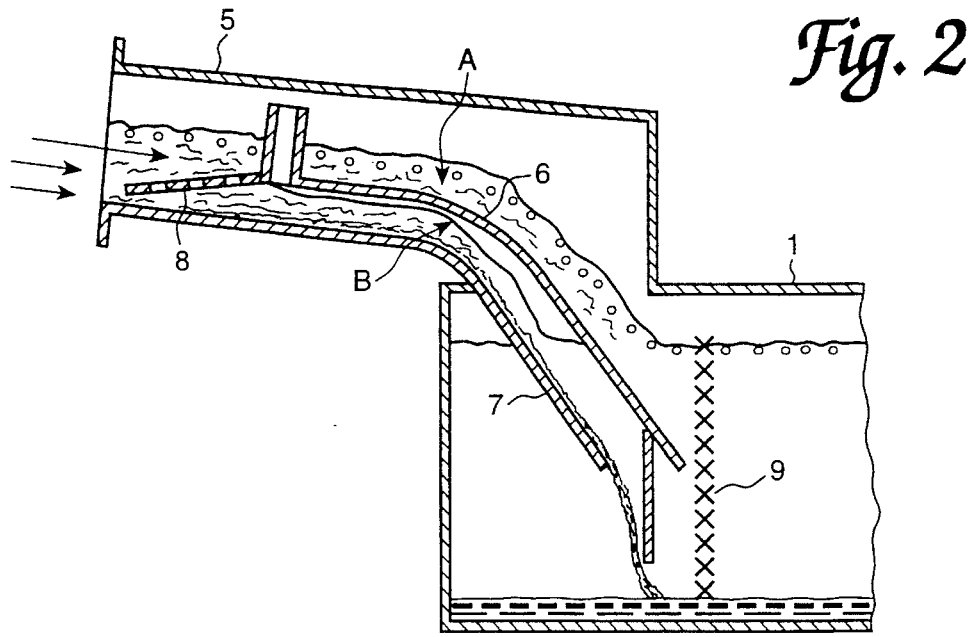
FIG. 2 is a fragmentary longitudinal vertical sectional view of a first embodiment of the arrangement according to the invention.

The invention is specifically concerned with the return oil side of the circulation lubrication system. FIG. 2 is a general view of a first embodiment of the arrangement according to the invention. The same reference numerals as in FIG. 1 are used in FIG. 2 for corresponding parts. According to the essential idea of the invention the flow returning from the parts 4 to be lubricated to the lubricant tank 1 is divided into at least two superimposed flow portions A, B so that the flow portion containing air bubbles forms the upper flow portion A, and the flow portion containing water and heavy particles forms the lower portion B. The flow is divided by means of at least one plate member 6. The division of the flow into two portions takes place so that the upper flow portion A passes along the plate member 6 into the tank 1. The lower flow portion B passes into the tank along the bottom part of the pipe 5 and a control plate 7 forming an extension of the pipe. In addition, a perforated plate 8 is provided in order to make the flow even as the speed of the flow upon the plate member 6 and that of the flow upon the control plate may be unequal. The flow portion B is passed by means of the plate member 6 and the control plate 7 close to the bottom of the tank 1. The flow portion A, in turn, remains close to the upper surface of the oil contained in the tank so that the air bubbles are able to rise quickly to the surface.

The plate member 6 and the control plate interest the oil surface at an angle such that the formation of air bubbles is insignificant when the oil flow interests the oil surface. The intersection angle may vary from 0 to 60 degrees. In the prior art, it has been a common practice that the oil drops freely from the pipe on the oil surface, so that very large amounts of foam have been formed. Large dirt particles are collected e.g. by means of a grate 9. The grate 9 is obvious to one skilled in the art.

Figure 3:
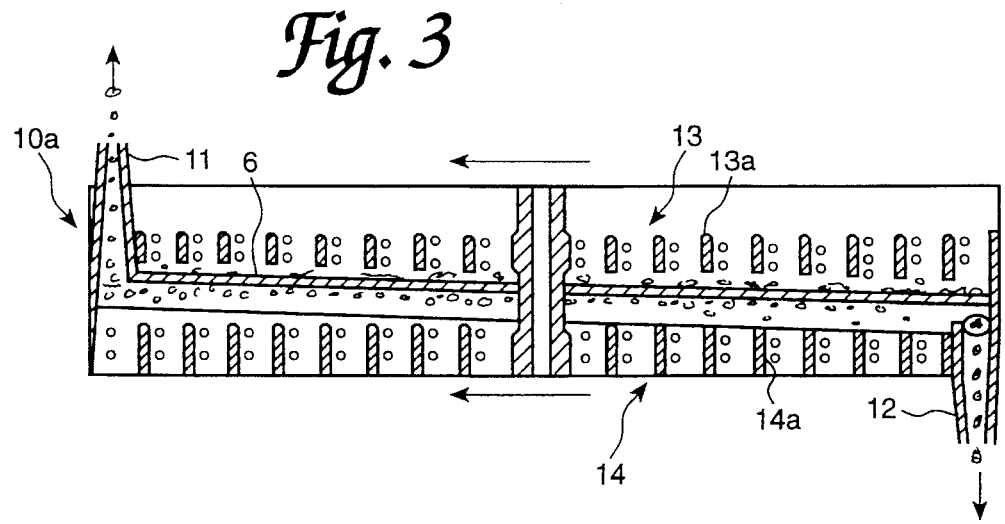
FIGS. 3 and 4 are sectional views taken in different directions of a second embodiment of the arrangement according to the invention.
Figure 4:
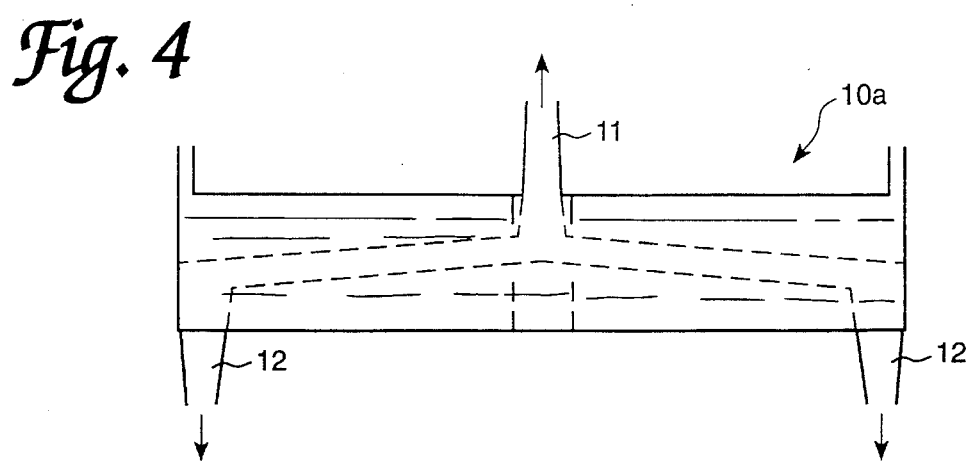
Figure 5:
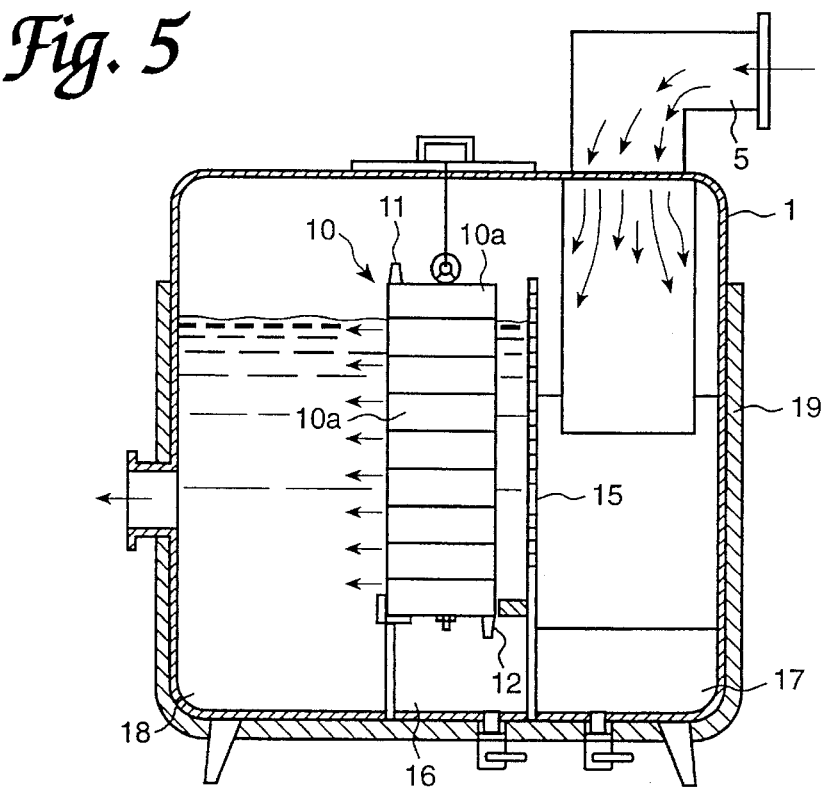
FIG. 5 is a sectional view of an oil tank in which an assembly formed by the units shown in FIG. 3 and 4 is placed.

FIGS. 3 to 5 show a second preferred embodiment of the arrangement according to the invention. This embodiment comprises a plurality of plate members 6 positioned one upon another with a mutual spacing such that they divide the oil flow into several superimposed flow portions. The idea is realized by a honey-combed unit 10 shown in FIG. 5. It is assembled of parts 10a shown in FIGS. 3 and 4. The honey-combed unit 10 may be positioned in the oil tank 1 as shown in FIG. 5. Oil is arranged to flow through the unit so that the plate member 6 in each part 10a of the unit divides the flow into two portions as shown in FIG. 3, so that air, water and heavy dirt particles are separated from the flow.

Being lighter than oil, air rises upward while water and heavy dirt particles, being heavier than oil, fall downward. In this way the air bubbles are collected on the lower surface of the plate member 6, where from they pass upward into a discharge pipe 11 due to their lightness and the inclination of the plate member 6. Correspondingly, water and dirt particles are collected on the upper surface of the plate member 6, along which they pass under the influence of their weight into a pipe 12 to be discharged.

The parts 10a are piled one upon another so that a flow path is provided for oil between two adjacent parts 10a, i.e. the plate members 6 in the parts 10a divide the flow into superimposed portions, as described above. A grate structure 13, 14 is positioned above and below each plate member 6. The grate structure is arranged to guide air bubbles and dirt particles entered between the individual walls 13a, 14a of the grate structure in a substantially vertical direction. Spacings between the parts 10a are so small that the vertical distance of travel required for air, water and dirt is short and the separation takes place over a short oil flow distance. In practice, the walls 13a, 14a of the grate structure catch the air bubbles and dirt entered between them. Between the walls 13a, 14a, the dirt particles and air bubbles pass vertically, as mentioned above. The dirt particles pass downward to the upper surface of the plate member 6 of the next lower part 10a, while the air bubbles pass on to the lower surface of the next upper plate member 6, etc. The flow is made even by means of a plate 15. The plate is of conventional structure. Spaces 16, 17 in the tank are for collecting water. The pump of the circulation lubrication system sucks oil from a space 18. The reference numeral 19 indicates a thermal insulation which ensures that the temperature of oil exceeds 45° C. throughout the oil contained in the tank. It is to be noted that if the temperature of oil drops to e.g. 30° C. and there is moisture present in the tank, optimal growing conditions for bacteria will be created, and air begins to be formed in the tank. Bacterial growth is inhibited, e.g., by keeping the temperature within the range from 45° to 60° C.

Figure 6:
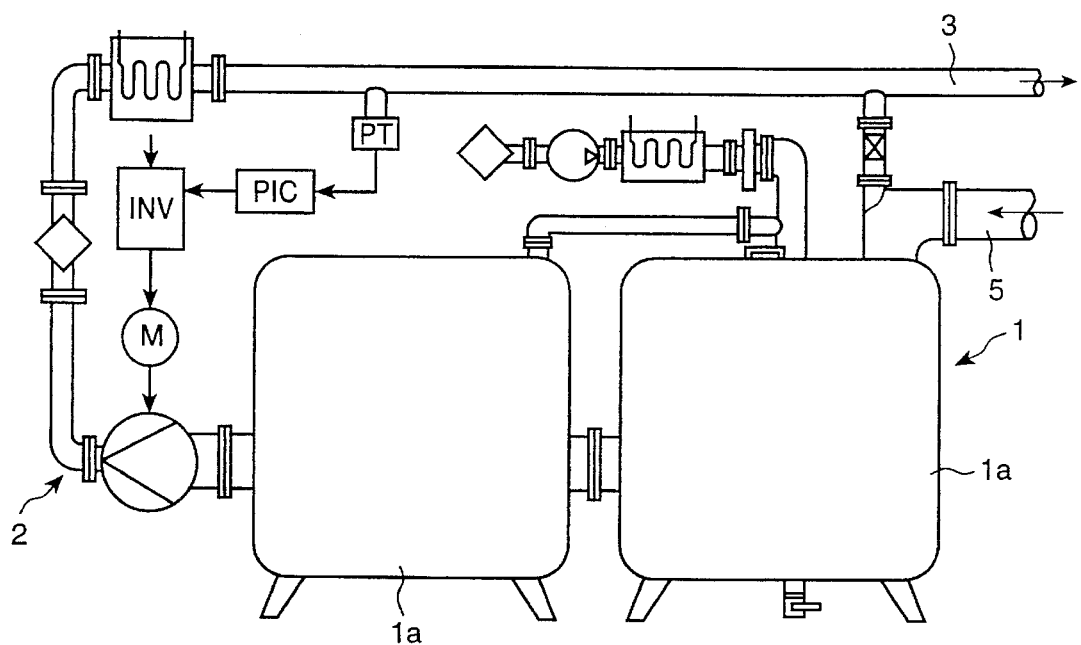
FIG. 6 is a general view of a preferred oil tank arrangement in the arrangement according to the invention.

FIG. 6 shows an example of a lubricating oil tank 1 suitable for the arrangement according to the invention. The tank 1 may comprise e.g. two tank modules 1a, which is an advantageous solution in that it spares space.

Figure 7:
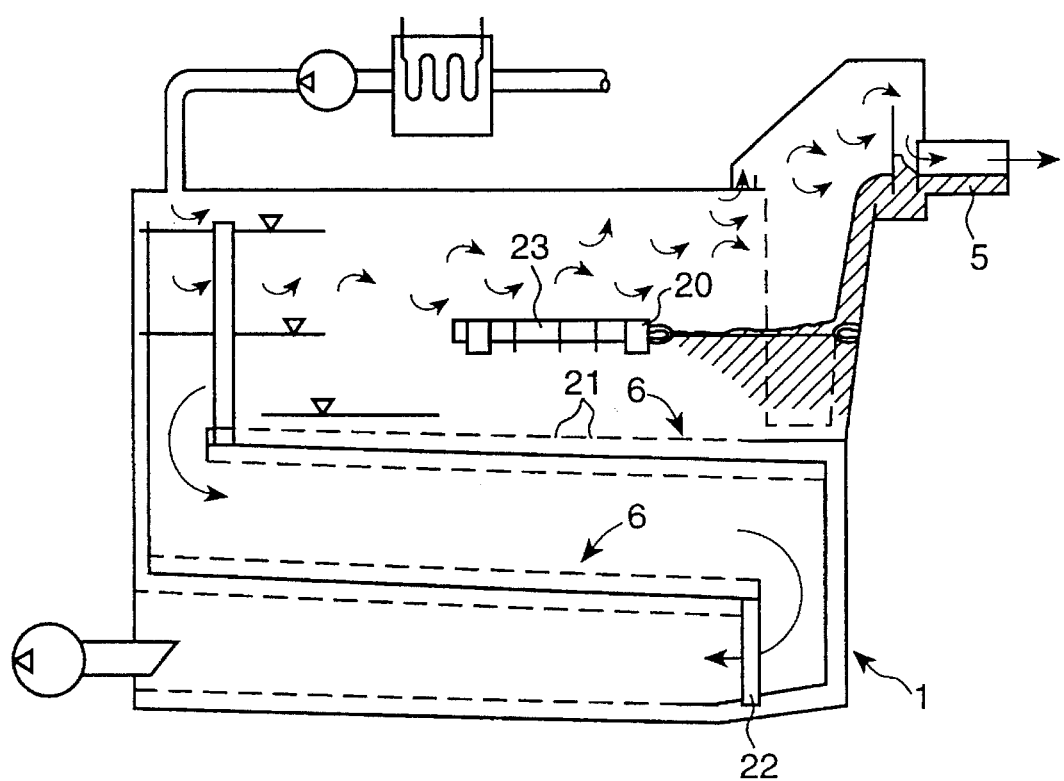
FIG. 7 is a general view of another preferred oil tank arrangement in the arrangement according to the invention.

FIG. 7 is a general view of a second preferred embodiment of the arrangement according to the invention. An advantage of this embodiment is that the tank is very small. Oil returning from the parts to be lubricated enters the tank 1 through the pipe 5. A floating surface flow-levelling means 20 follows the surface of the oil when the surface level varies. The float parts keep the levelling means 20 on the surface, and the laths 25 allow the air bubbles entered between them to rise upward. The device is secured to the inner wall of the tank, e.g., by means of a wire rope.

Each plate member 6 comprises a grate plate and a plate portion. The grate plates separate the plate portions from the oil flow. Between the grate plate and the plate portion, the flow of air and water is opposite in direction to the main flow of oil. Paths 21 allow air bubbles to rise upward, while paths 22 allow moisture to fall down on the bottom of the tank 1.

The embodiments described above are by no means intended to restrict the invention, but the invention may be modified within the scope of the claims as desired. Accordingly, it is evident that the arrangement according to the invention or its details need not necessarily be such as shown in the figures but other solutions are possible as well. For instance, the oil tank may be of any shape, comprise various modules, etc.

I claim:

1. A method implemented in a circulation lubrication system which includes a lubricating oil tank having a bottom and containing oil having an upper surface, at least one pressure pipe line for supplying the oil from the tank to at least one part to be lubricated, at least one return pipe line for returning the oil from said at least one part to said tank, at least one pump for pumping the oil from said tank into said at least one pressure pipe, and adjustment structure for maintaining a desired lubrication situation in said system for said at least one part, said method comprising:

(a) dividing said returning oil into at least two vertically superimposed flow portions, including an upper flow portion containing gas bubbles, and a lower flow portion containing at least one of aqueous condensate and heavy particles;

(b) passing said upper flow portion into said tank adjacent said upper surface; and (c) passing said lower flow portion into said tank adjacent said bottom of said tank.

2. The method of claim 1, further including:

in steps (b) and (c) intersecting each said flow portion with said upper surface at an angle ranging between 0° and 60° to said upper surface.

3. The method of claims 1, wherein:

said at least two vertically superimposed flow portions comprise at least three vertically superimposed flow portions, each one additional to said upper and lower flow portions being disposed between said upper and lower flow portions.

4. A circulation lubrication system, comprising:

at least one part to be lubricated;

a lubricating oil tank having a bottom and arranged to contain oil having an upper surface;

at least one pressure pipe line for supplying the oil from said tank to said at least one part to be lubricated;

at least one return pipe line for returning the oil from said at least one part to said tank;

at least one pump for pumping the oil from said tank into said at least one pressure pipe;

adjustment structure for maintaining a desired lubrication situation in said system for said at least one part; and at least two plate members interposed in said at least one return pipe line and arranged for dividing said returning oil into at least two vertically superimposed flow portions, including an upper flow portion containing gas bubbles, and a lower flow portion containing at least one of aqueous condensate and heavy particles, and for passing said upper flow portion into said tank adjacent said upper surface; and passing said lower flow portion into said tank adjacent said bottom of said tank, each said plate member being disposed for supporting a respective said flow portion, and said plate members being substantially parallel to one another.

5. The apparatus of claims 4, wherein: said plate members are spatially arranged to cause said respective flow portions supported thereon to intersect said upper surface at an angle ranging between 0° and 60° to said upper surface.

6. The apparatus of claims 4, wherein: said at least two plate members include at least three plate members arranged to support at least three superimposed flow portions, each one additional to said upper and lower flow portions being disposed between said upper and lower flow portions.

7. The apparatus of claims 6, further comprising: an upper grate structure, and a lower grate structure associated with each said plate member and respectively arranged to pass said gas bubbles encountered thereby substantially vertically upwardly and said heavy particles encountered thereby substantially vertically downwardly.

8. The apparatus of claims 7, wherein:

each said plate member slopes forwardly downward, has a lower surface arranged for guiding said gas bubbles towards an upper end thereof for discharging upwardly, and an upper surface arranged for guiding said aqueous condensate and heavy particles towards a lower end thereof for discharging downwardly.

* * * * *